(12) United States Patent
Son

(10) Patent No.: US 11,679,512 B2
(45) Date of Patent: Jun. 20, 2023

(54) TOOL CHANGER AND TOOL CHANGE SYSTEM INCLUDING THE SAME

(71) Applicant: LG ELECTRONICS INC., Seoul (KR)

(72) Inventor: Changwoo Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 773 days.

(21) Appl. No.: 16/582,764

(22) Filed: Sep. 25, 2019

(65) Prior Publication Data

US 2020/0016771 A1 Jan. 16, 2020

(30) Foreign Application Priority Data

Aug. 29, 2019 (KR) ........................ 10-2019-0106846

(51) Int. Cl.
*B23Q 3/155* (2006.01)
*B25J 15/04* (2006.01)
*B25J 9/12* (2006.01)

(52) U.S. Cl.
CPC ........... *B25J 15/0408* (2013.01); *B25J 9/126* (2013.01)

(58) Field of Classification Search
CPC .... B25J 15/0458; B25J 15/04; B25J 15/0408; B25J 15/0433; B23Q 3/155
See application file for complete search history.

(56) References Cited

FOREIGN PATENT DOCUMENTS

KR 100313306 B1 * 11/2001

* cited by examiner

*Primary Examiner* — Randell J Krug
(74) *Attorney, Agent, or Firm* — Birch, Stewart, Kolasch & Birch, LLP

(57) ABSTRACT

A tool changer includes a case including a plurality of case bodies that are separated from each other, a fixed body disposed in the case, a shaft disposed in the case and extending a long way in an axial direction of the case, a motor configured to rotate the shaft, a moving body configured to move along the shaft based on rotation of the shaft, and a plurality of pushers connected to the fixed body via a first link, connected to the moving body via a second link, and configured to press the case body in an outer radial direction when the moving body moves towards the fixed body.

8 Claims, 15 Drawing Sheets

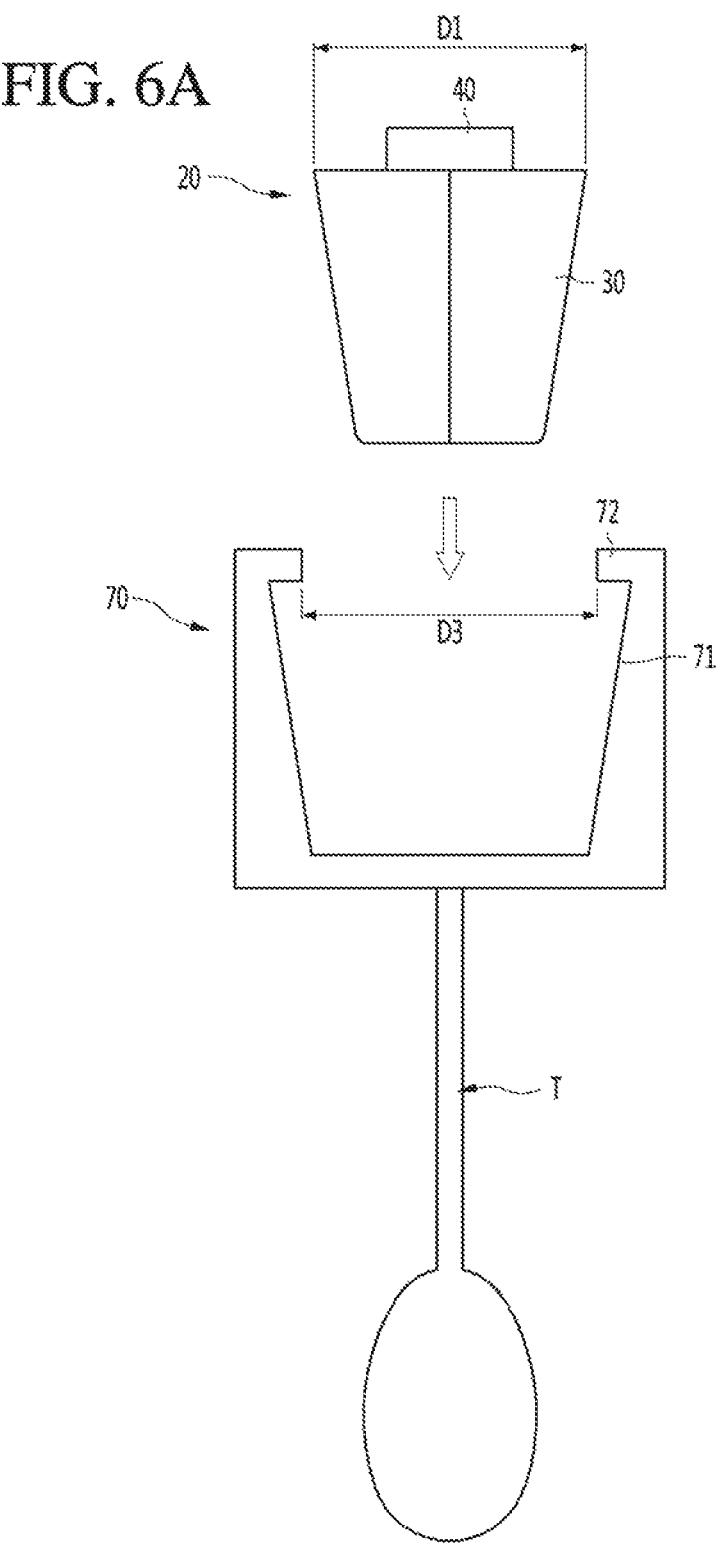

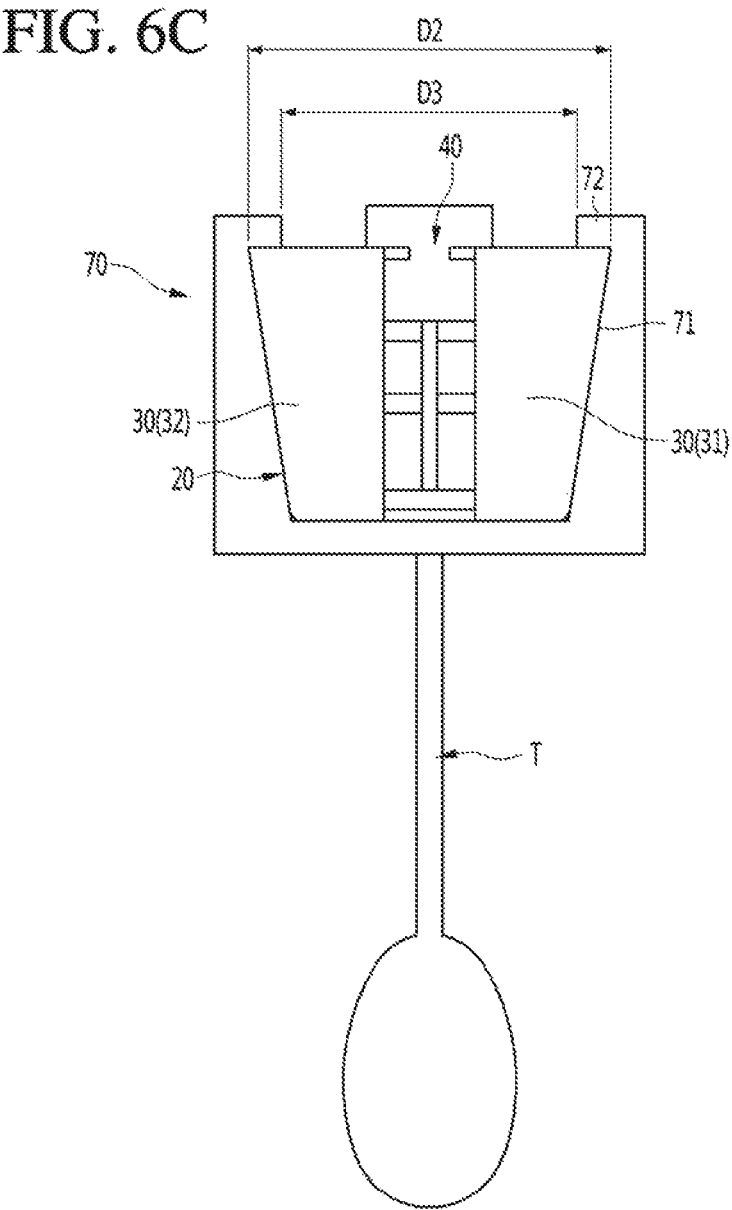

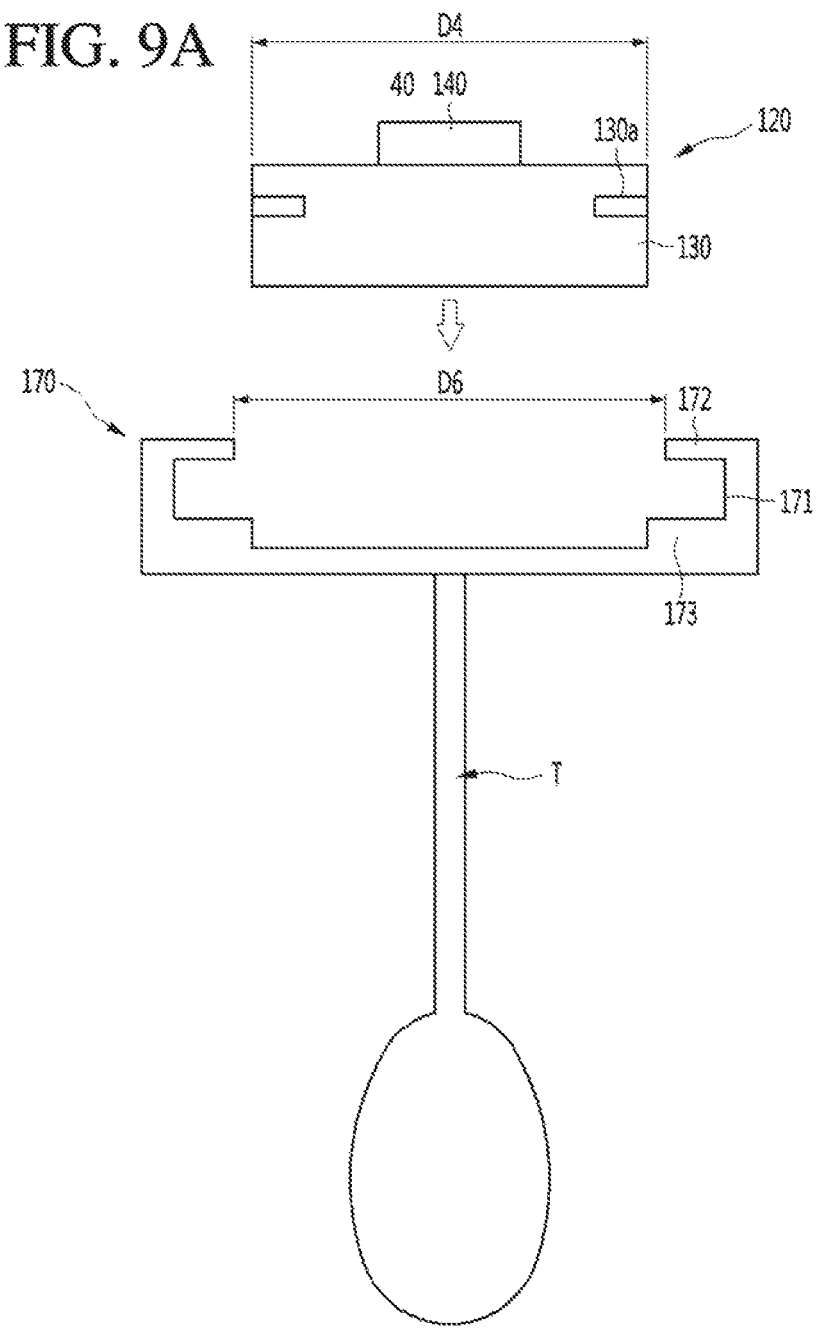

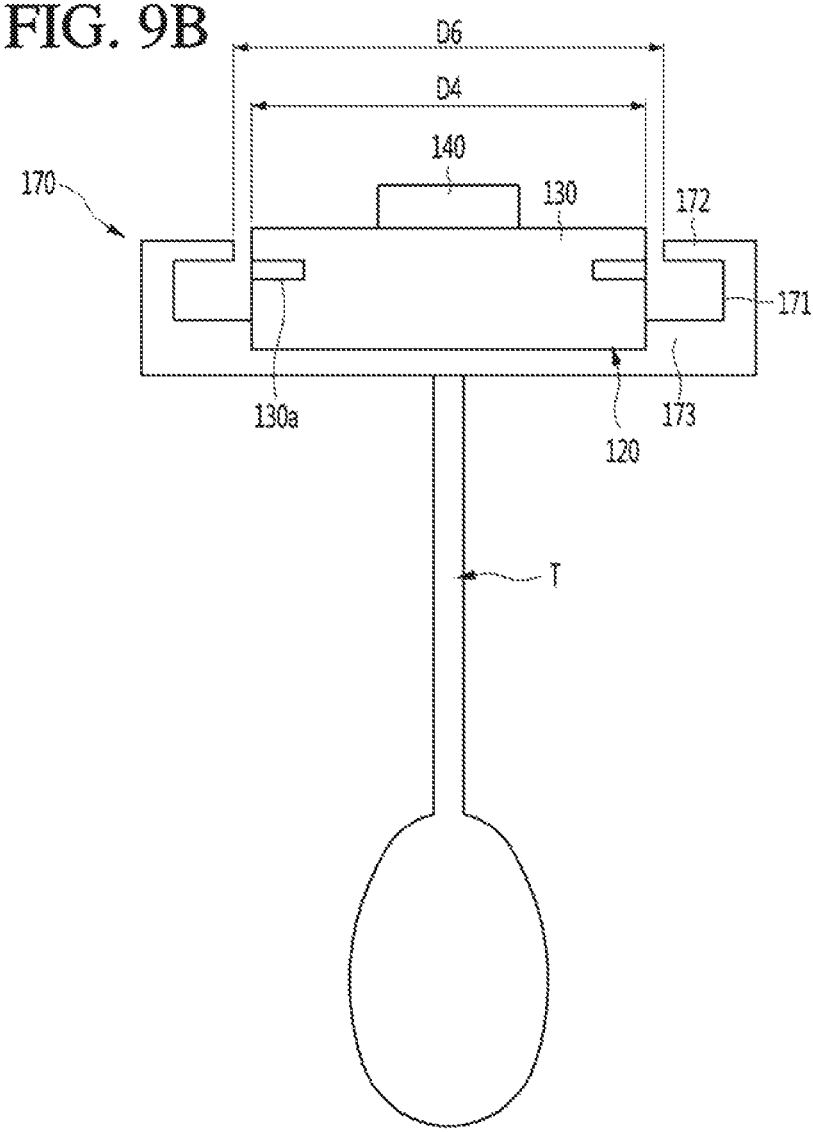

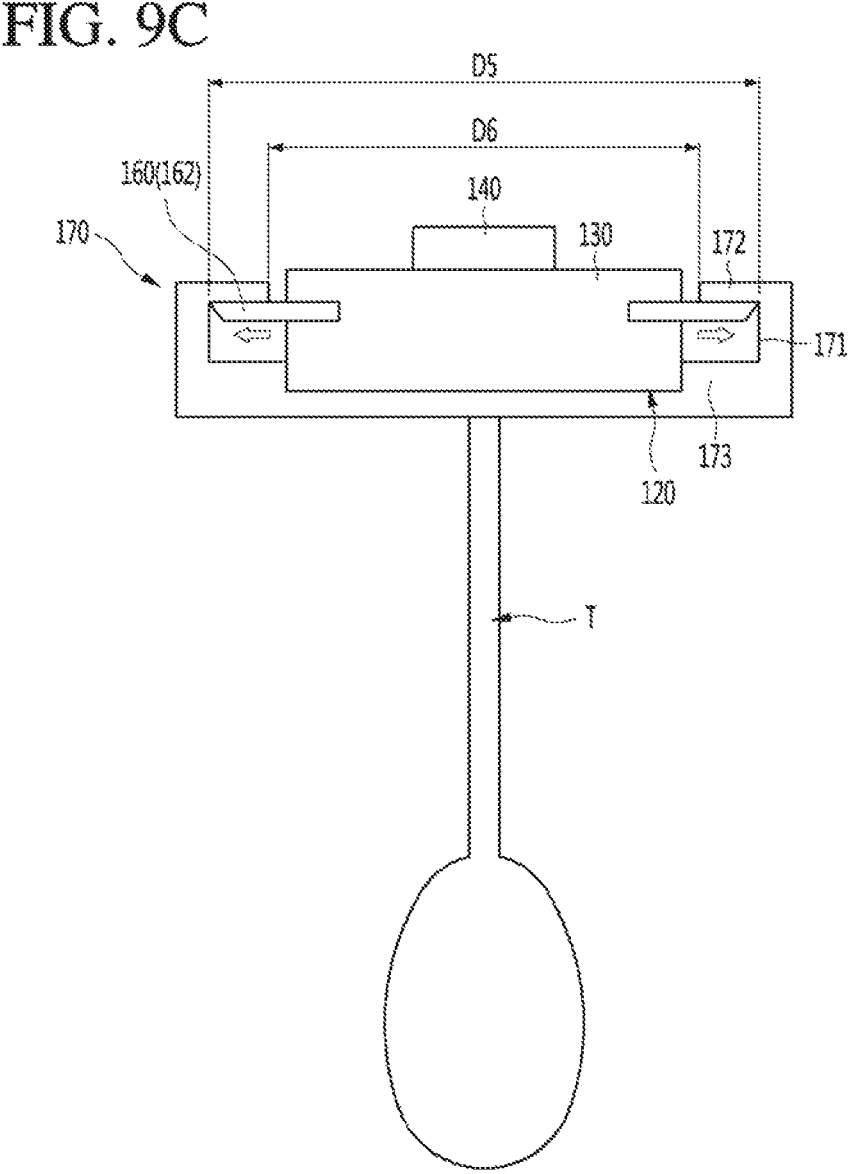

TOOL CHANGER AND TOOL CHANGE SYSTEM INCLUDING THE SAME

CROSS-REFERENCE TO RELATED APPLICATION

This application claims the benefit of Korean Patent Application No. 10-2019-0106846, filed on Aug. 29, 2019, which is hereby incorporated by reference as if fully set forth herein.

BACKGROUND OF THE DISCLOSURE

Field of the Disclosure

The present disclosure relates to a tool changer for changing a tool and a tool change system including the same.

Discussion of the Related Art

In general, mechanical equipment that performs a similar behavior to that of the human using an electrical or magnetic action is referred to as a robot. Recently, robots have been used in various fields due to development of control technologies, and are, for example, surgical robots, household robots, service robots, aerospace remote robots, or hazardous materials robots. These robots perform an operation using a manipulator configured to perform a similar motion to movement of the arm or the hand according to electrical and mechanical mechanisms.

In particular, a household robot may perform a specific operation by coupling a specific tool to the manipulator. For example, a cooking robot may cook by coupling various tools such as a ladle, tongs, or a pot.

Accordingly, in order to increase operation efficiency of a robot, it is important to rapidly and accurately change a tool by a tool changer included in a manipulator.

However, a conventional tool changer uses a pneumatic system, and thus there is a problem in that the tool changer has a large structure and requires subsidiary equipment to incur high costs and to cause noise.

SUMMARY OF THE DISCLOSURE

An object of the present disclosure is to provide a tool changer for rapidly and simply coupling/decoupling a tool and a tool change system including the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a tool changer includes a case including a plurality of case bodies that are separated from each other, a fixed body disposed in the case, a shaft disposed in the case and extending a long way in an axial direction of the case, a motor configured to rotate the shaft, a moving body configured to move along the shaft based on rotation of the shaft, and a plurality of pushers connected to the fixed body via a first link, connected to the moving body via a second link, and configured to press the case body in an outer radial direction when the moving body moves towards the fixed body.

The tool changer may further include a plurality of elastic members configured to pull the case body in an inner radial direction.

An outer circumference of the case may have a diameter that decreases downwards.

The tool changer may further include a connecting body coupled to a manipulator and protruding in the axial direction of the case. A guide groove configured to guide the case body may be formed on the connecting body.

A motor accommodating portion configured to accommodate the motor may be formed on the connecting body.

In another aspect of the present disclosure, a tool change system includes a tool coupler coupled to a tool, and a tool changer included in a manipulator and selectively coupled to the tool coupler, wherein the tool coupler includes an opening having the tool changer inserted thereinto, and a flange protruding inwards from the opening and configured to restrain the tool changer, and wherein the tool changer includes a case including a plurality of case bodies that are separated from each other, a fixed body disposed in the case, a shaft disposed in the case and extending a long way in an axial direction of the case, a motor configured to rotate the shaft, a moving body configured to move along the shaft based on rotation of the shaft, and a plurality of pushers connected to the fixed body via a first link, connected to the moving body via a second link, and configured to press the case body in an outer radial direction to make the case body be restrained by the flange.

An inner circumference of the opening and an outer circumference of the case may each have a diameter that decreases downwards.

The tool changer may further include a plurality of elastic members configured to pull the case body inwards.

The tool changer may further include a connecting body coupled to the manipulator and protruding in a radial direction of the case, and the connecting body may be positioned inside the flange when the case is accommodated in the opening.

In another aspect of the present disclosure, a tool change system includes a tool coupler coupled to tool, and a tool changer included in a manipulator and selectively coupled to the tool coupler, wherein the tool coupler includes an opening having the tool changer inserted thereinto, and a flange protruding inwards from the opening and configured to restrain the tool changer, and wherein the tool changer includes a motor, a driving gear rotated by the motor, a plurality of driven gear engaged with the driving gear, and a locker coupled to the driven gear and rotated to be restrained by the flange.

The driven gear may have a diameter greater than a diameter of the driving gear.

A distance between a rotation axis of the driving gear and a rotation axis of the driven gear may be equal to or greater than ⅓ of a radius of the opening and is equal to or less than ⅔ of the radius of the opening.

The locker may include a gear coupler coupled to the driven gear, and a wing connected to the gear coupler and caught by the flange, and an evasion groove configured to prevent interference with a gear coupler of another locker is formed on the wing.

An outer edge of the wing may contact an inner circumference of the opening.

An outer edge of the wing may have a curvature corresponding to the inner circumference of the opening.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 6A to 6C are diagrams for explanation of an operation of a tool change system according to an embodiment of the present disclosure.

FIGS. 9A to 9C are diagrams for explanation of an operation of a tool change system according to another embodiment of the present disclosure.

DETAILED DESCRIPTION OF THE DISCLOSURE

Figure 1:
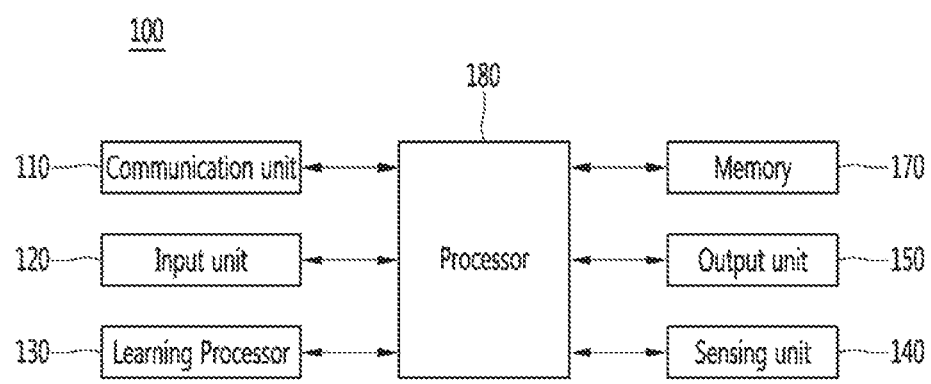
FIG. 1 illustrates an AI device 100 including a robot according to an embodiment of the present disclosure.

Hereinafter, the present disclosure will be described in detail by explaining exemplary embodiments of the disclosure with reference to the attached drawings.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
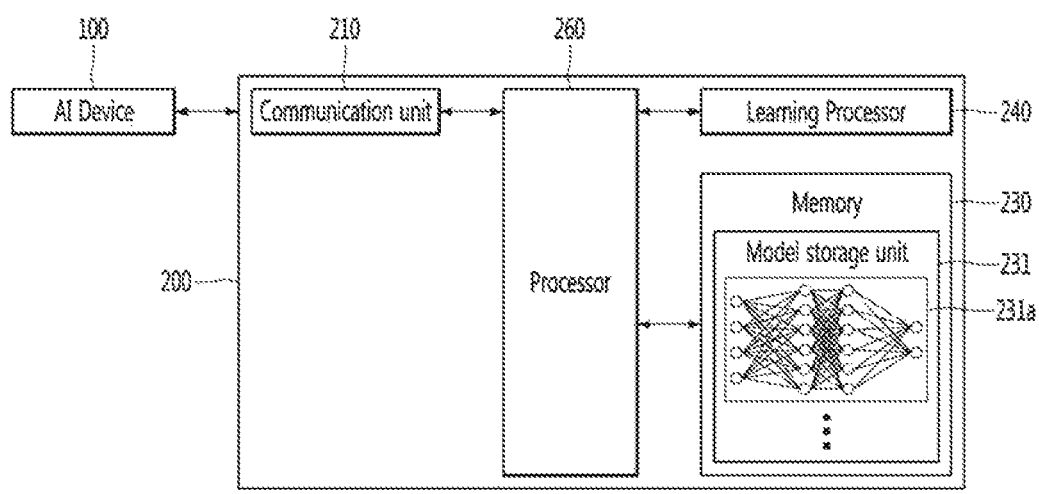
FIG. 2 illustrates an AI server 200 connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
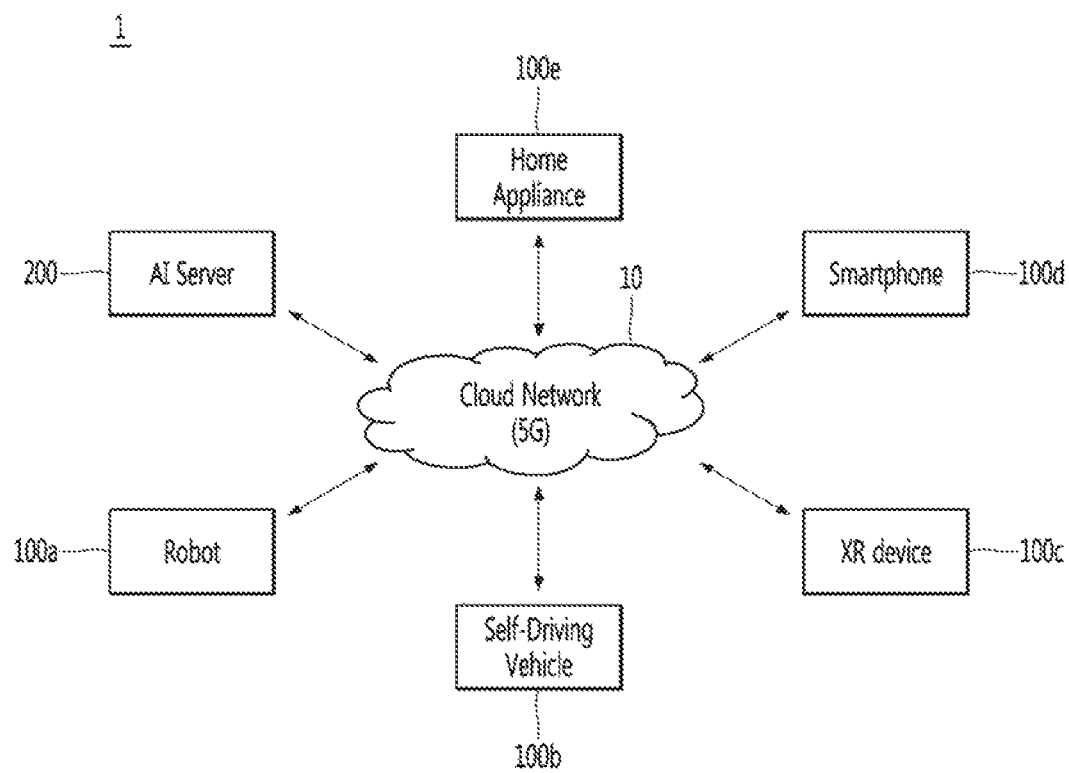
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
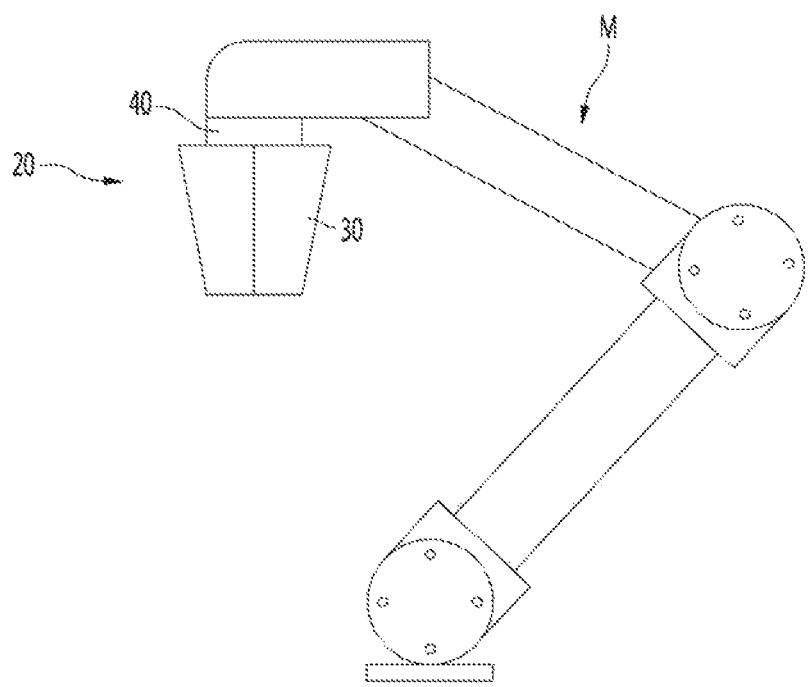
FIG. 4 is a schematic diagram showing a state in which a tool changer is coupled to a manipulator according to an embodiment of the present disclosure.
Figure 5A:
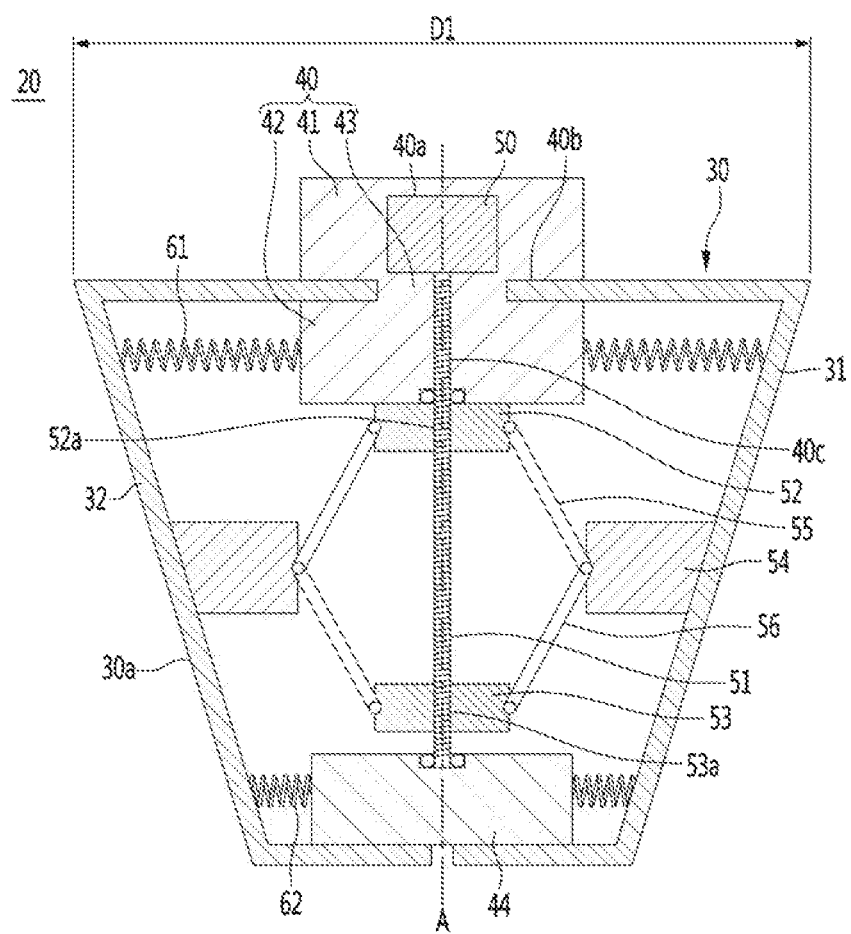
FIGS. 5A and 5B are diagrams showing an inner part of a tool changer according to an embodiment of the present disclosure.
Figure 5B:
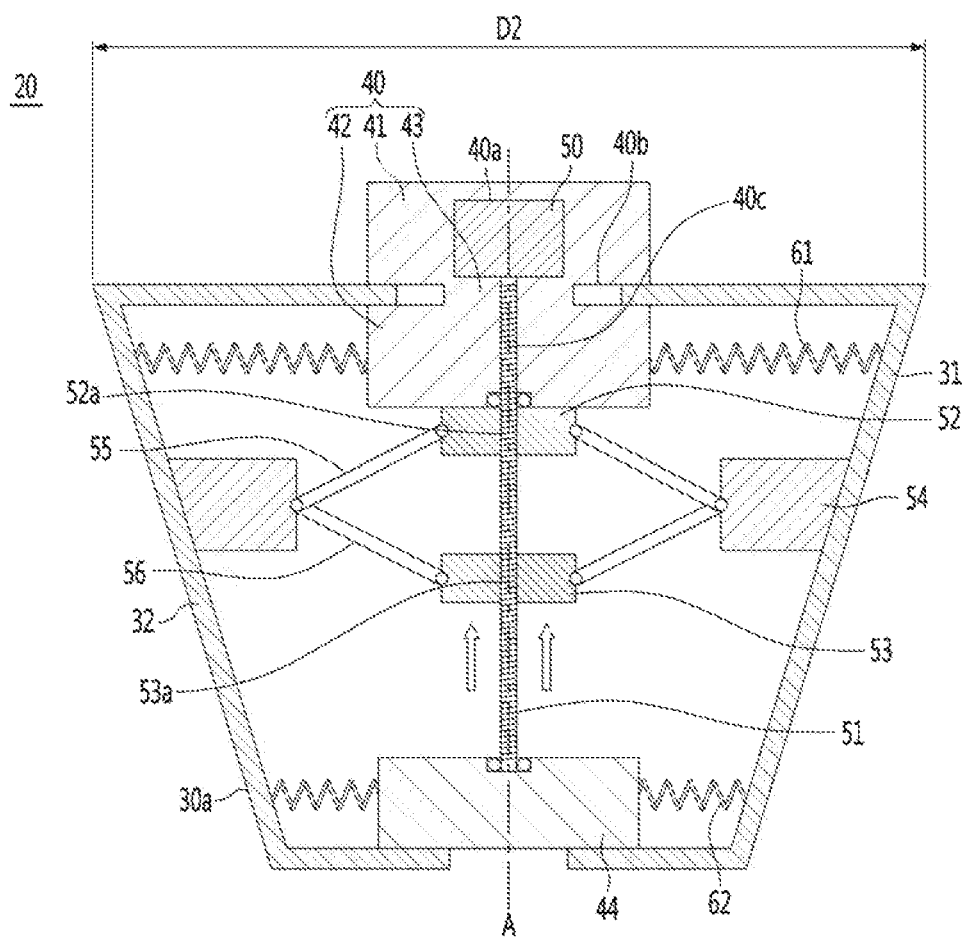
Figure 6B:
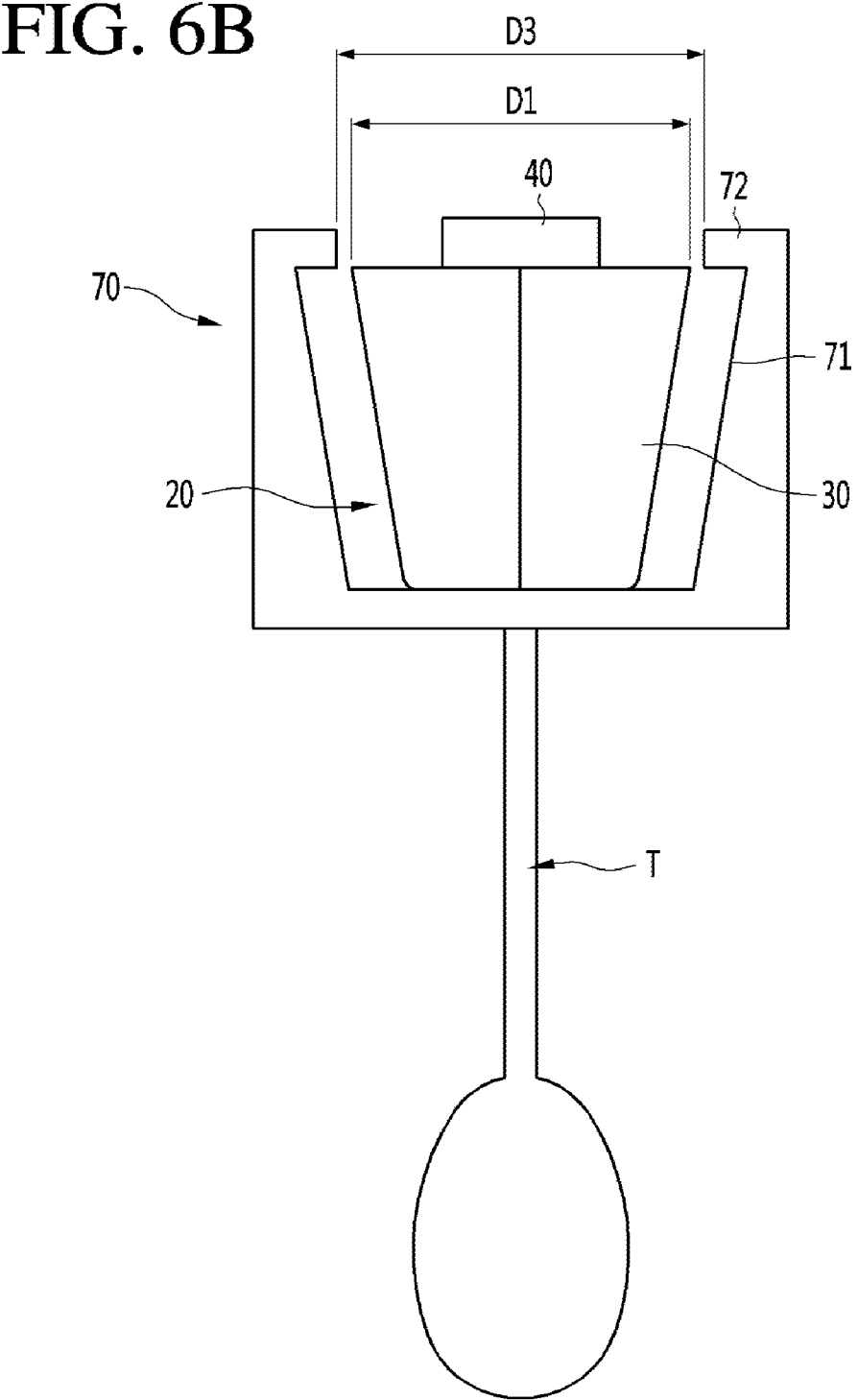

FIG. 4 is a schematic diagram showing a state in which a tool changer is coupled to a manipulator according to an embodiment of the present disclosure. FIGS. 5A and 5B are diagrams showing an inner part of a tool changer according to an embodiment of the present disclosure. FIGS. 6A to 6C are diagrams for explanation of an operation of a tool change system according to an embodiment of the present disclosure.

The tool change system according to an embodiment of the present disclosure may include a tool changer 20 and a tool coupler 70.

The tool changer 20 may be included in a manipulator M. In more detail, the tool changer 20 may be disposed on an end of the manipulator M. The manipulator M may be a component included in the aforementioned robot 100a.

The tool coupler 70 may be detachably coupled to a tool T. In this case, it may be advantageous that the tool coupler 70 is coupled to the tool T that is a commercial product and is used. The tool T may be required to perform an operation of the manipulator M. For example, the tool T may be any one of a spoon, a ladle, and a spatula.

The tool changer 20 may be selectively coupled to the tool coupler 70. That is, the tool T may be coupled to the tool changer 20 by the tool coupler 70, and the manipulator M may perform an operation using the tool T.

The tool changer 20 may decouple the tool T and the tool coupler 70 from a tool mounter (not shown) or may install the tool T and the tool coupler 70 on the tool mounter. The tool changer 20 may select and use the required tool T among various types of tools T installed on a plurality of tool mounters. That is, the tool changer 20 may change the tool T to be used by the manipulator M.

Hereinafter, a configuration of the tool changer 20 will be described with reference to FIGS. 5A and 5B.

The tool changer 20 according to the present embodiment may include a case 30, a motor 50, a shaft 51, a fixed body 52, a moving body 53, and a pusher 54.

The case 30 may form an outer appearance of the tool changer 20. An internal space may be formed in the case 30. A horizontal section of the case 30 may be shaped like a circular ring. A vertical imaginary central axis A may be defined in the case 30.

A diameter of the case 30 may decrease downwards. That is, an outer circumferential surface of the case 30 may taper.

The case 30 may include a plurality of case bodies 31 and 32 that are separated from each other. The plurality of case bodies 31 and 32 may be separated from each other in a horizontal direction. The plurality of case bodies 31 and 32 may be arranged in a circumferential direction of the case 30. The case bodies 31 and 32 may have the same size and shape.

For example, the case 30 may include three case bodies that are separated from each other, and upper and lower surfaces of each of the case bodies may be shaped like a circular sector with a central angle of 120 degrees.

In another example, the case 30 may include the two case bodies 31 and 32 that are separated from each other, and upper and lower surfaces of each of the case bodies 31 and 32 may be shaped like a semicircle. Hereinafter, an example of this case will be described.

The case 30 may include a first case body 31 and a second case body 32 that are separated from each other.

When the first case body 31 and the second case body 32 contact each other and are connected to each other, an upper-end diameter of the case 30 may be a first diameter D1. As shown in FIG. 5A, the upper-end diameter of the case 30 may be the first diameter D1 at ordinary time.

When the tool changer 20 and the tool coupler 70 are coupled to each other, the case 30 may be widened in a horizontal direction. In more detail, the first case body 31 and the second case body 32 may be spaced apart from each other in a horizontal direction. In this case, as shown in FIG. 5B, the upper-end diameter of the case 30 may be a second diameter D2.

That is, the upper-end diameter of the case 30 may be variable between the first diameter D1 and the second diameter D2 greater than the first diameter D1.

The motor 50 may rotate the shaft 51. An upper or lower end of the shaft 51 may be connected to the motor 50. Hereinafter, the case in which in which the motor 50 is connected to an upper end of the shaft 51 will be exemplified.

At least a portion of the shaft 51 may be positioned inside the case 30. The shaft 51 may extend a long way in an axial direction (e.g., a vertical direction) of the case 30. That is, the shaft 51 may be positioned at the central axis A of the case 30.

A male screw thread may be formed on an outer circumferential surface of the shaft 51. Accordingly, the moving body 53 that is described below may move according to rotation of the shaft 51.

The fixed body 52 may be fixed to the inside of the case 30. The fixed body 52 may be horizontally disposed. A position to which the fixed body 52 is fixed is not limited.

For example, the fixed body 52 may be coupled to a connecting body 40 that is described below or may be integrated into the connecting body 40.

The shaft 51 may be disposed through the fixed body 52, in more detail, a central axis of the fixed body 52. The central axis of the fixed body 52 may match the central axis A of the case 30.

In more detail, a through hole 52a that the shaft 51 penetrates may be formed on the fixed body 52. The through hole 52a may be formed by penetrating the center of the fixed body 52 in upward and downward directions. The inner circumference of the through hole 52a may be spaced apart from the shaft 51. Accordingly, the fixed body 52 may not interfere with rotation of the shaft 51.

The moving body 53 may be horizontally disposed. The moving body 53 may be spaced apart from the fixed body 52 in a longitudinal direction of the shaft 51. The moving body 53 may be positioned above or below the fixed body 52. Hereinafter, the case in which the moving body 53 is positioned below the fixed body 52 will be exemplified.

The moving body 53 may be connected to the shaft 51. The moving body 53 may move along the shaft 51 based on rotation of the shaft 51. That is, the moving body 53 may move up and down based on rotation of the shaft 51.

The shaft 51 may be connected to the moving body 53 through the moving body 53, in more detail, the central axis of the moving body 53. The central axis of the moving body 53 may match the central axis A of the case 30.

In more detail, a connection hole 53a that the shaft 51 penetrates may be formed in the moving body 53. The connection hole 53a may be formed by penetrating the center of the moving body 53 in upward and downward directions. A female screw thread may be formed on an inner circumference of the connection hole 53a. The female screw thread may be configured to be engaged with the male screw thread formed on the outer circumference of the shaft 51. Accordingly, when the shaft 51 rotates in one direction, the moving body 53 may move up, and when the shaft 51 rotates in an opposite direction, the moving body 53 may move down.

That is, when the shaft 51 rotates in one direction, the moving body 53 may move to approach the fixed body 52, and when the shaft 51 rotates in an opposite direction, the moving body 53 may move away from the fixed body 52.

The pusher 54 may press the case bodies 31 and 32 in an outer radial direction.

At least a portion of an external surface of the pusher 54 may have a shape corresponding to an internal surface of the case bodies 31 and 32. In more detail, a portion of the external surface of the pusher 54, which is oriented towards the internal surface of the case bodies 31 and 32, may be inclined downwards in an inner radial direction, like the internal surface of the case bodies 31 and 32.

The pusher 54 may be configured in a plural number, and the number of the pushers 54 may be the same as the number of the case bodies 31 and 32. The plurality of pushers 54 may be spaced apart from each other at a predetermined interval in a circumferential direction of the case 30.

In more detail, any one of the pushers 54 may press the first case body 31 to one side, and the other one of the pushers 54 may press the second case body 32 to the other side.

Each of the pushers 54 may be connected to the fixed body 52 via a first link 55 and may be connected to the moving body 53 via a second link 56.

The first link 55 and the second link 56 may each be shaped like a bar.

One end of the first link 55 may be rotatably connected to the fixed body 52, and the other end of the first link 55 may be rotatably connected to the pusher 54. For example, the opposite ends of the first link 55 may be hinged to the fixed body 52 and the pusher 54, respectively.

One end of the second link 56 may be rotatably connected to the moving body 53, and the other end of the second link 56 may be rotatably connected to the pusher 54. For example, the opposite ends of the second link 56 may be hinged to the moving body 53 and the pusher 54, respectively.

The height of the pusher 54 may be higher than the height of any one of the fixed body 52 and the moving body 53 based on the lower surface of the case 300 and may be lower than the height of another one of the fixed body 52 and the moving body 53.

For example, the height of the pusher 54 may be lower than that of the fixed body 52 and may be higher than that of the moving body 53. Accordingly, the first link 55 may be inclined with a height to decrease in an outer radial direction of the case 30, and the second link 56 may be inclined with a height to increase in the outer radial direction of the case 30.

When the moving body 53 moves down and away from the fixed body 52, an inclination of the first link 55 and the second link 56 may gradually increase. In addition, the pusher 54 may move down, and simultaneously, may move in the inner radial direction of the case 30.

On the other hand, when the moving body 53 moves up to approach the fixed body 52, an inclination of the first link 55 and the second link 56 may gradually decrease. In addition, the pusher 54 may move up, and simultaneously, may move in the outer radial direction of the case 30 and may press the case bodies 31 and 32.

The tool changer 20 according to the present embodiment may further include a plurality of elastic members 61 and 62. The elastic members 61 and 62 may pull the case bodies 31 and 32 in the inner radial direction.

The elastic members 61 and 62 may extend and retract in the radial direction of the case 30. The elastic members 61 and 62 may be a coil spring but is not limited thereto.

The elastic members 61 and 62 may be biased to pull the case bodies 31 and 32 in the inner radial direction. Thus, in a state in which the pusher 54 presses the case bodies 31 and 32, the plurality of case bodies 31 and 32 may be prevented from being spaced apart from each other.

The elastic members 61 and 62 may include the upper elastic member 61 and the lower elastic member 62.

The upper elastic member 61 may pull upper portions of case bodies 31 and 32. For example, one end of the upper elastic member 61 may be connected to the connecting body 40 that is described below, and the other end of the upper elastic member 61 may be connected to an upper portion of the internal surface of the case bodies 31 and 32.

The upper elastic member 61 may be configured in a plural number. The plurality of upper elastic members 61 may be spaced apart from each other in a circumferential direction.

The lower elastic member 62 may pull lower portions of the case bodies 31 and 32. For example, one end of the lower elastic member 62 may be connected to a lower body 44 that is described below, and the other end of the lower elastic member 62 may be connected to a lower portion of the internal surface of the case bodies 31 and 32.

The length of the lower elastic member 62 may be smaller than the length of the upper elastic member 61. This is because a diameter of the case 30 decreases downwards.

The lower elastic member 62 may be configured in a plural number. The plurality of lower elastic members 62 may be spaced apart from each other in the circumferential direction.

When the pusher 54 presses each of the case bodies and 32 in the outer radial direction, the plurality of case bodies 31 and 32 may move in the outer radial direction and may be spaced apart from each other, and the upper elastic member 61 and the lower elastic member 62 may extend.

When the pusher 54 moves the case bodies 31 and 32 in the inner radial direction, the plurality of case bodies 31 and 32 may move in the inner radial direction and may be connected to each other due to restoring force of the upper elastic member 61 and the lower elastic member 62.

The tool changer 20 according to the present embodiment may include the connecting body 40 and the lower body 44.

The connecting body 40 may be coupled to the manipulator M. Thus, the tool changer 20 may be disposed at an end of the manipulator M. An accommodating space 40a for accommodating the motor 50 therein may be formed in the connecting body 40. Thus, the motor 50 may be installed in the connecting body 40.

The connecting body 40 may protrude in the axial direction of the case 30. The central axis A of the case 30 may pass the connecting body 40.

In more detail, the connecting body 40 may be formed in such a way that at least a portion of the connecting body 40 protrudes upwards from a central portion of an upper surface of the case 30. Thus, the connecting body 40 may be referred to as an upper body.

A guide groove 40b for guiding the case bodies 31 and 32 may be formed on the connecting body 40.

The guide groove 40b may be formed along the outer circumference of the connecting body 40. An upper end of each of the case bodies 31 and 32 may be inserted into the guide groove 40b. Thus, an interval between the plurality of case bodies 31 and 32 may increase or decrease in a state in which an upper portion of each of the plurality of case bodies 31 and 32 is inserted into the guide groove 40b.

The guide groove 40b may be positioned between an outer portion 41 and an inner portion 42, which are described below, in upward and downward directions and may be positioned outside a connection portion 43 in a horizontal direction.

An open hole 40c that the shaft 51 penetrates may be formed in the connecting body 40. The open hole 40c may extend a long way in upward and downward directions. The inner circumference of the open hole 40c may be spaced apart from the shaft 51. Thus, the connecting body 40 may not interfere with rotation of the shaft 51.

The open hole 40c may be positioned in a straight line with the through hole 52a of the fixed body 52. Thus, the shaft 51 connected to the motor 50 may sequentially penetrate the open hole 40c and the through hole 52a and may extend in the case 30.

The connecting body 40 may include the outer portion 41 positioned outside the case 30, the inner portion 42 positioned inside the case 30, and the connection portion 43 for connecting the outer portion 41 and the inner portion 42 to each other. The connecting body 40 may be integrally formed.

The outer portion 41 may be positioned above the upper surface of the case 30. The outer portion 41 may be coupled to the manipulator M.

The outer portion 41 may include two or more parts that are detachably coupled to each other. For example, the motor 50 may be installed in the outer portion 41, and the outer portion 41 may include an accommodating portion in which the accommodating space 40a for accommodating the motor 50 therein is formed, and a cover portion that covers an upper side of the accommodating space and is coupled to the manipulator M.

The inner portion 42 may be positioned below the upper surface of the case 30. The aforementioned upper elastic member 61 may be connected to the outer circumference of the inner portion 42. The plurality of upper elastic members 61 may be spaced apart from each other at a predetermined interval along the outer circumference of the inner portion 42.

The aforementioned fixed body 52 may be fixed to the inner portion 42. The fixed body 52 may be coupled to the inner portion 42 or may be integrated into the inner portion 42, and the open hole 40c may be connected to the through hole 52a.

The connection portion 43 may be positioned between the outer portion 41 and the inner portion 42. The connection portion 43 may face the upper portion of the plurality of case bodies 31 and 32 in the radial direction. That is, the connection portion 43 may be positioned inside the upper portion of the plurality of case bodies 31 and 32.

The lower body 44 may be disposed inside the lower portion of the case 30. A lower end of the shaft 51 may be connected to the lower body 44. In more detail, the lower body 44 may include a bearing to which a lower end of the shaft 51 is connected.

The lower body 44 may be positioned above the lower surface of the case 30.

The lower body 44 may contact a lower portion of the case bodies 31 and 32, in more detail, a bottom surface of the inside of the case bodies 31 and 32. An interval between the plurality of case bodies 31 and 32 may increase or decrease while contacting the lower body 44. That is, the lower body may guide the case bodies 31 and 32 with the guide groove 40b of the connecting body 40.

The aforementioned lower elastic member 62 may be connected to the outer circumference of the lower body 44. The plurality of lower elastic members 62 may be spaced apart from each other at a predetermined interval along the outer circumference of the lower body 44.

Hereinafter, a configuration of the tool coupler 70 will be described with reference to FIGS. 6A to 6C.

The tool coupler 70 may be coupled to the tool T and may be accommodated on a tool mounter (not shown). The tool coupler 70 may include an opening 71 and a flange 72.

The opening 71 may be configured in such a way that the tool changer 20 is inserted thereinto. The opening 71 may be open upwards.

The inner circumference of the opening 71 may face the outer circumference of the case 30 of the tool changer 20. The internal diameter of the opening 71 may be greater than the external diameter of the case 30 at ordinary time. In more detail, when an interval between the plurality of case bodies 31 and 32 of the tool changer 20 decreases, an external surface of the case bodies 31 and 32 may be spaced apart from the inner circumference of the opening 71. When an interval between the plurality of case bodies 31 and 32 of the tool changer 20 increases, the external surface of the case bodies 31 and 32 may contact the inner circumference of the opening 71.

The inner circumference of the opening 71 may decrease downwards, like the outer circumference of the case 30 of the tool changer 20. That is, the inner circumference of the opening 71 may taper. Thus, the tool coupler 70 may be stably coupled to the tool changer 20 without shaking.

The flange 72 may protrude to the inside of the opening 71. In more detail, the flange 72 may protrude in the inner radial direction at an upper end of the opening 71. The flange 72 may be formed in the inner circumferential direction of the opening 71. The flange 72 may be stepped with the inner circumference of the opening 71.

The flange 72 may restrain the tool changer 20, in more detail, the case bodies 31 and 32.

The internal diameter D3 of the flange 72 may be greater than the aforementioned first diameter D1 and may be smaller than the second diameter D2. Thus, in a state in which an interval between the plurality of case bodies 31 and 32 of the tool changer 20 decreases, the tool changer 20 may move through the inside of the flange 72 and may be easily inserted into the opening 71 or may be easily decoupled from the opening 71.

On the other hand, in a state in which the tool changer 20 is inserted into the opening 71, when an interval between the plurality of case bodies 31 and 32 increases, the case bodies 31 and 32 may be restrained by the flange 72. Thus, the case bodies 31 and 32 may be restrained by the tool coupler 70 in upward and downward directions, and the tool changer 20 and the tool coupler 70 may be coupled to each other.

Hereinafter, an operation of the tool changer 20 according to the present embodiment will be described.

As shown in FIG. 6A, the manipulator M (refer to FIG. 4) may move the tool changer 20 towards the opening 71 of the tool coupler 70.

As shown in FIG. 6B, the upper-end diameter of the tool changer 20 may be the first diameter D1 that is smaller than the internal diameter D3 of the flange 72, and thus the tool changer 20 may be easily inserted into the opening 71 through the inside of the flange 72. In this case, the outer circumference of the case 30 of the tool changer 20 may be spaced apart from the inner circumference of the opening 71. The connecting body 40 of the tool changer 20 may be positioned inside the flange 72.

As shown in FIG. 6C, in a state in which the tool changer 20 is positioned in the opening 71, an interval between the plurality of case bodies 31 and 32 may increase. In more detail, the case bodies 31 and 32 may be separated from each other until an external surface of each of the case bodies 31 and 32 contacts the inner circumference of the opening 71, and the upper-end diameter of the tool changer 20 may be the second diameter D2 that is greater than the internal diameter D3 of the flange 72. Thus, the tool changer 20 may be restrained by the opening 71 in the radial direction and may be restrained by the flange 72 in the axial direction. That is, the tool changer 20 and the tool coupler 70 may be firmly coupled to each other.

The tool changer 20 may be decoupled and separated from the tool coupler 70 at an opposite order to the aforementioned procedure.

Figure 7A:
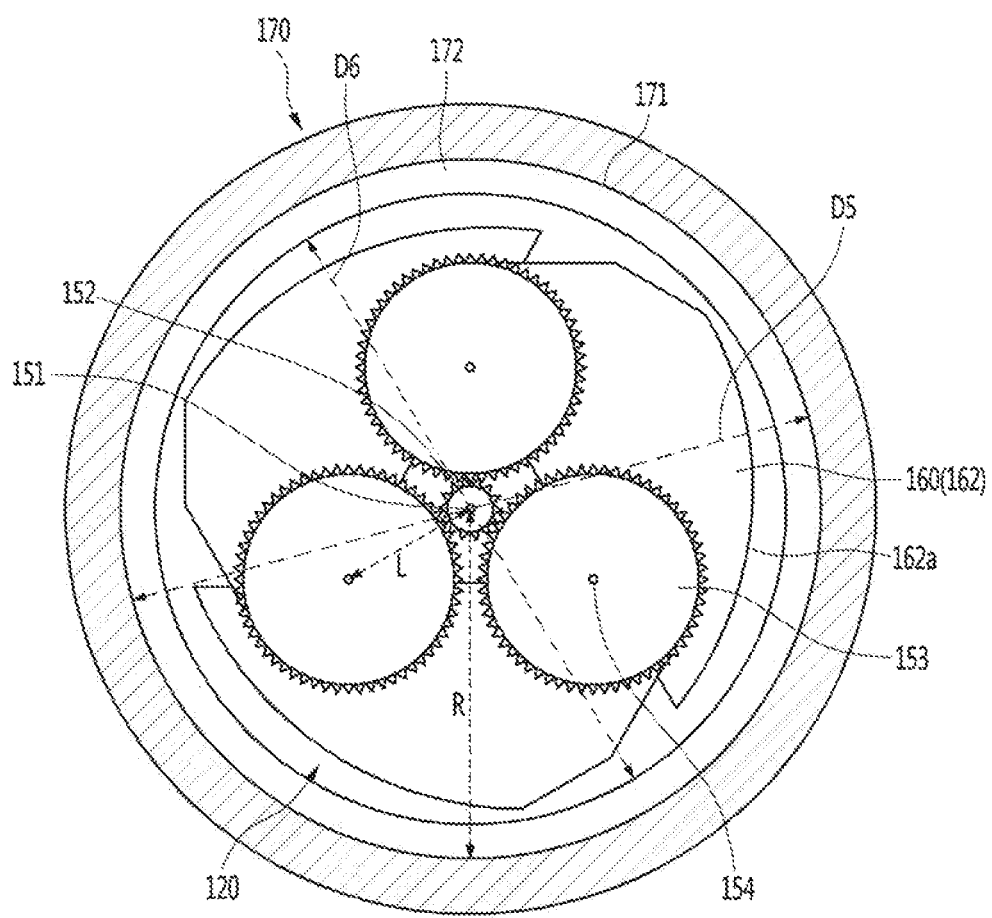
FIGS. 7A and 7B are diagrams for explanation of a configuration of a tool changer according to another embodiment of the present disclosure.
Figure 7B:
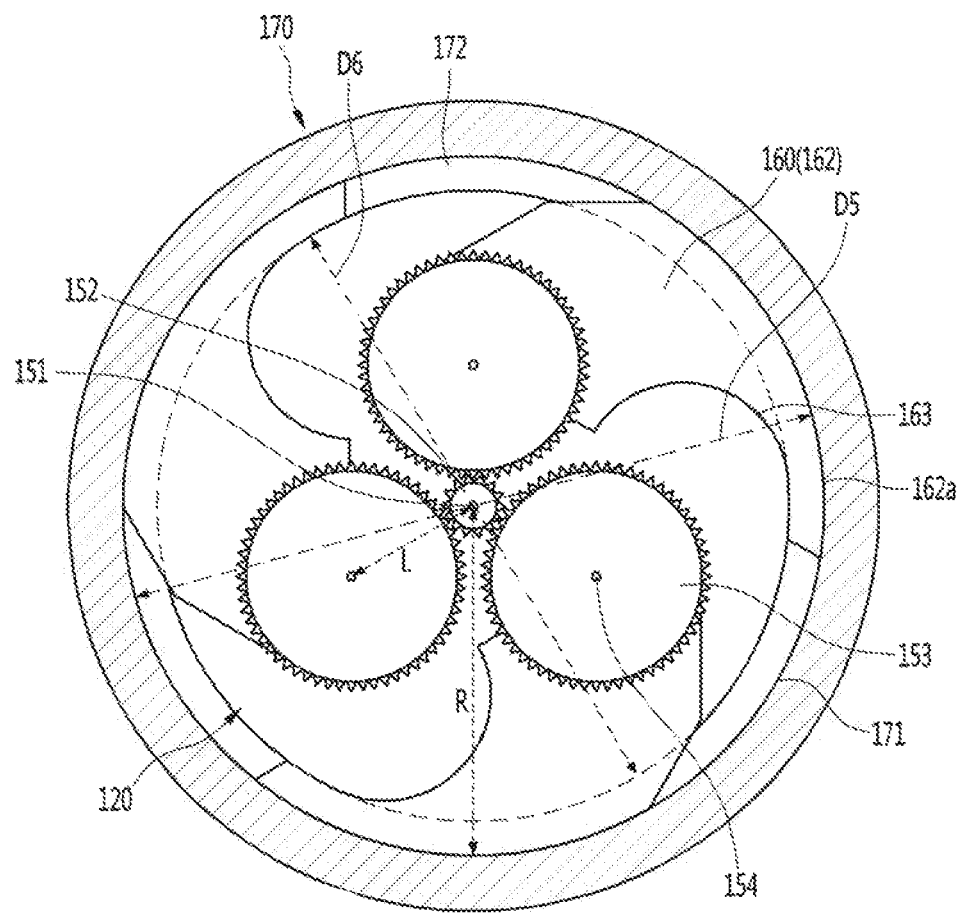
Figure 8A:
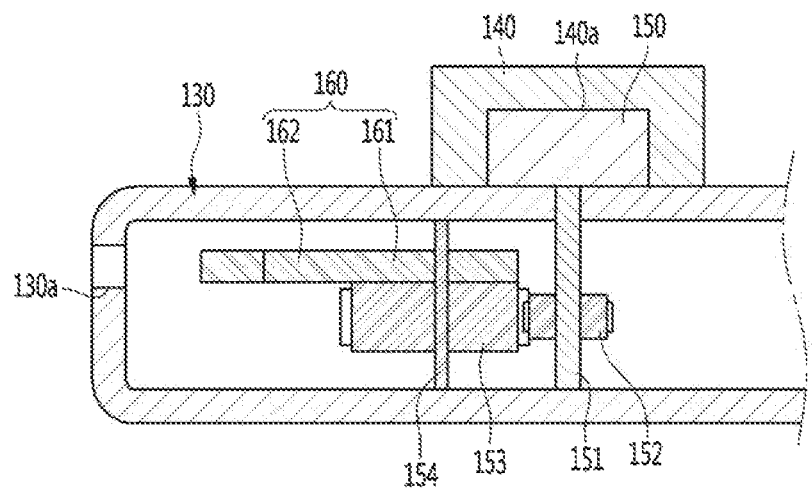
FIGS. 8A and 8B are diagrams showing an inner part of a tool changer according to another embodiment of the present disclosure.
Figure 8B:
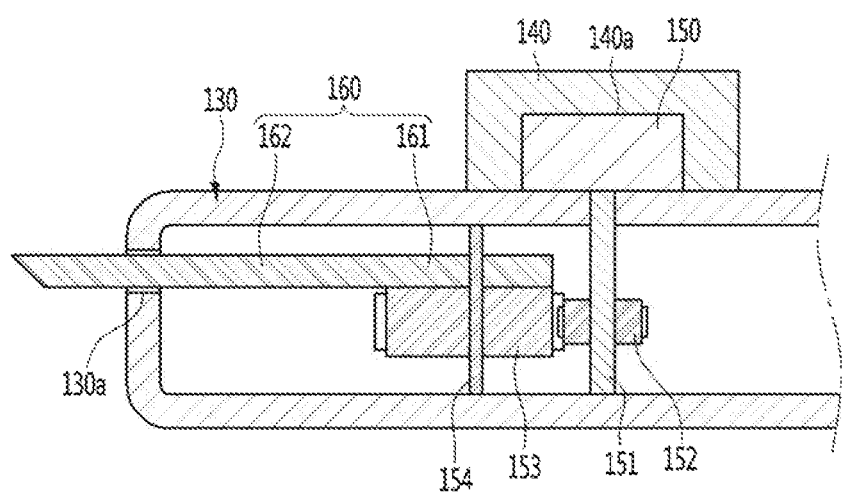

FIGS. 7A and 7B are diagrams for explanation of a configuration of a tool changer according to another embodiment of the present disclosure. FIGS. 8A and 8B are diagrams showing an inner part of a tool changer according to another embodiment of the present disclosure. FIGS. 9A to 9C are diagrams for explanation of an operation of a tool change system according to another embodiment of the present disclosure.

The tool change system according to an embodiment of the present disclosure may include a tool changer 120 and a tool coupler 170. The above description of the tool changer 20 and the tool coupler 70 according to the aforementioned embodiment may be applied to functions of the tool changer 120 and the tool coupler 170.

Hereinafter, a configuration of the tool changer 20 will be described with reference to FIGS. 5A and 5B.

The tool changer 120 according to the present embodiment may include a case 130, a motor 150, a driving gear 152, a driven gear 153, and a locker 160.

The case 130 may form an outer appearance of the tool changer 120. An internal space may be formed in the case 130. A horizontal section of the case 130 may be shaped like a circular ring. A vertical imaginary central axis may be defined in the case 130.

An opening 130a that a wing 162 of the locker 160 to be described below penetrates may be formed in the case 130. The plurality of openings 130a may be spaced apart from each other at a predetermined interval in a circumferential direction of the case 130.

The motor 150 may rotate a driving gear 152. In more detail, a shaft 151 may be connected to the motor 150, and the driving gear 152 may be connected to the shaft 151. The shaft 151 may be vertically configured. The shaft 151 may match the central axis of the case 30.

The driving gear 152 may be positioned inside the case 130 and may be rotated by the motor 150. The driving gear 152 may be rotated around the shaft 151. That is, the shaft 151 may be a rotation axis of the driving gear 152.

The driven gear 153 may be engaged with the driving gear 152. Accordingly, rotation force of the driving gear 152 may be transferred to the driven gear 153.

A diameter of the driven gear 153 may be greater than a diameter of the driving gear 152. Accordingly, angular velocity of the driven gear 153 may be smaller than angular velocity of the driving gear 152. Thus, the locker 160 that is described below may be prevented from being excessively rapidly rotated.

The plurality of driven gears 153 may be spaced apart from each other at a predetermined interval in a circumferential direction of the driving gear 152. For example, the three driven gear 153 may be configured.

The driven gear 153 may be connected to a sub shaft 154 and may be rotated around the sub shaft 154. That is, the sub shaft 154 may be a rotation axis of the driven gear 153. The sub shaft 154 may be vertically configured in the case 130. The sub shaft 154 may be spaced apart from the shaft 151 in parallel thereto.

The locker 160 may be coupled to the driven gear 153. In more detail, the driven gear 153 may be coupled to an upper or lower side of the locker 160. The locker 160 may be rotated along with the driven gear 153. The locker 160 may be rotated to be restrained by a flange 172 of the tool coupler 170.

The locker 160 may be configured in a plural number, and the number of the lockers 160 may be the same as the number of the driven gears 153.

Each of the lockers 160 may include a gear coupler 161 coupled to the driven gear 153, and the wing 162 connected to the gear coupler 161.

The gear coupler 161 may overlap the driven gear 153 in a longitudinal direction of the sub shaft 154, that is, a vertical direction. The wing 162 may not overlap the driven gear 153 in the longitudinal direction of the sub shaft 154, that is, a vertical direction.

Each of the wings 162 may extend in the outer radial direction from the gear coupler 161 and may be bent in one circumferential direction.

The wing 162 of one locker 160 may be bent toward the gear coupler 161 of the other locker 160. Accordingly, an evasion groove 163 for preventing interference with the gear coupler 161 of the other locker 160 may be formed on the wing 162. Thus, the plurality of lockers 160 may be accommodated in the compact case 130.

When the driven gear 153 is rotated in one direction, the wing 162 may be restrained by the flange 172 of the tool coupler 170, as shown in FIG. 7B. The evasion groove 163 of each of the wings 162 may be spaced apart from the gear coupler 161 of the other locker 160.

When the driven gear 153 is rotated in one direction, the wing 162 may move outwards and may move through the opening 130a of the case 130, as shown in FIG. 8B. That is, a portion of the wing 162 may protrude in the outer radial direction of the case 130 and may be restrained by the flange 172 of the tool coupler 170.

The wing 162 may move outwards and may contact the inner circumference of an opening 171 of the tool coupler 170. In more detail, an outer edge 162a of the wing 162 may contact the inner circumference of the opening 171 and may press the inner circumference of the opening 171 in the outer radial direction. Thus, frictional force between the wing 162 and the inner circumference of the opening 171 may be increased, and the tool changer 120 and the tool coupler 170 may be more firmly coupled to each other.

The outer edge 162a of the wing 162 may have a curvature corresponding to the inner circumference of the opening 171. Thus, a contact area between the outer edge 162a of the wing 162 and the inner circumference of the opening 171 may be maximized.

When the driven gear 153 is rotated in an opposite direction, the wing 162 may not be restrained by the flange 17 of the tool coupler 170, as shown in FIG. 7A. The evasion groove 163 of each of the wings 162 may contact the gear coupler 161 of the other locker 160. That is, the gear coupler 161 of the other locker 160 may be inserted into the evasion groove 163 of the wing 162 of one locker 160.

When the driven gear 153 is rotated in an opposite direction, the wing 162 may move inwards, may be positioned inside the case 130, and may not be restrained by the flange 172 of the tool coupler 170, as shown in FIG. 8A.

The tool changer 120 according to the present embodiment may further include a connecting body 140. The connecting body 140 may be coupled to the manipulator M. In addition, an accommodating space 140a for accommodating the motor 150 therein may be formed in the connecting body 140.

The connecting body 140 may protrude in the axial direction of the case 130. In more detail, the connecting body 140 may be formed in such a way that at least a portion of the connecting body 140 protrudes upwards from a central portion of an upper surface of the case 130.

However, the present disclosure is not limited thereto, and the tool changer 120 according to the present embodiment may not include the connecting body 140. In this case, the motor 150 may be installed in the case 130 and the manipulator M may be coupled to the case 130.

The tool coupler 170 may be coupled to the tool T. The tool coupler 170 may include the opening 171 and the flange 172. The tool coupler 170 may further include a protrusion 173.

The opening 171 may be configured in such a way that the tool changer 120 is inserted thereinto. The opening 171 may be open upwards.

The inner circumference of the opening 171 may face the outer circumference of the case 130 of the tool changer 120. The internal diameter of the opening 171 may be greater than the external diameter of the case 130. Thus, the outer circumference of the case 130 may be spaced apart from the inner circumference of the opening 171.

The flange 172 may protrude to the inside of the opening 171. In more detail, the flange 172 may protrude in the inner radial direction at an upper end of the opening 171. The flange 172 may be formed in the inner circumferential direction of the opening 171. The flange 172 may be stepped with the inner circumference of the opening 171.

The flange 172 may restrain the locker 160 of the tool changer 120, in more detail, the wing 162.

An internal diameter D6 of the flange 172 may be smaller than an internal diameter D5 of the opening 171 and may be greater than an external diameter D4 of the case 130 of the tool changer 120. Accordingly, the tool changer 20 may move through the inside of the flange 172 and may be easily inserted into the opening 171 or may be easily decoupled from the opening 171.

The protrusion 173 may protrude inwards from the opening 171 and may be spaced apart from the flange 172 in upward and downward directions. In more detail, the protrusion 173 may protrude in the inner radial direction at a lower end of the opening 171. Accordingly, the protrusion 173 may be connected to a bottom surface of the opening 171. The protrusion 173 may be formed in the inner circumferential direction of the opening 171. The protrusion 173 may be stepped with the inner circumference of the opening 171.

The internal diameter of the protrusion 173 may be smaller than the internal diameter D5 of the opening 171 and may be the same or similar to the external diameter D4 of the case 130 of the tool changer 120. Thus, the tool changer 120 inserted into the opening 171 may be inserted into the inside of the protrusion 173. Accordingly, the tool changer 120 may be stably coupled to the tool coupler 170 in the radial direction without shaking.

A distance L between a rotation axis of the driving gear 152 and a rotation axis of the driven gear 153 may be equal to or greater than the radius R of the opening 171 of the tool coupler 170 and may be equal to or less than ⅔ of the radius R of the opening 171. That is, a distance between the shaft 151 and the sub shaft 154 may be equal to or greater than ⅓ of the radius R of the opening 171 and may be equal to or less than ⅔ of the radius R of the opening 171.

When the distance L between the rotation axis of the driving gear 152 and the rotation axis of the driven gear 153 is less than ⅓ of the radius R of the opening 171, angular displacement of the wing 162 based on rotation of the driving gear 152 may relatively decrease. Thus, there is a problem in that torque of the wing 162 for pressing the inner circumference of the opening 171 is reduced and the flange 172 is not stably restrained. When the distance L between the rotation axis of the driving gear 152 and the rotation axis of the driven gear 153 is greater than ⅔ of the radius R of the opening 171, there is a problem in that a contact area between the wing 162 and the inner circumference of the opening 171 decreases.

Hereinafter, an operation of the tool changer 20 according to the present embodiment will be described.

As shown in FIG. 9A, the manipulator M (refer to FIG. 4) may move the tool changer 120 towards the opening 171 of the tool coupler 170.

As shown in FIG. 9B, a diameter D4 of the case 130 of the tool changer 120 is smaller than an internal diameter D6 of the flange 172, and thus, the tool changer 120 may move through the inside of the flange 172 and may be easily moved into the opening 171. In addition, the tool changer 120 may be inserted into the inside of the protrusion 173.

As shown in FIG. 9C, in a state in which the tool changer 120 is positioned in the opening 171, the plurality of lockers 160 may be rotated outwards. In more detail, the wing 162 of each of the lockers 160 may protrude out of a case 310 through the opening 130a of the case 130 and may be rotated until the outer edge 162a of the wing 162 contacts the inner circumference of the opening 171.

Thus, the tool changer 120 may be restrained by the opening 171 in the radial direction and may be restrained by the flange 172 in the axial direction. That is, the tool changer 120 and the tool coupler 170 may be firmly coupled to each other.

The tool changer 120 may be decoupled and separated from the tool coupler 170 at an opposite order to the aforementioned procedure.

According to an exemplary embodiment of the present disclosure, a plurality of case bodies may be spaced apart from each other by a motor, a shaft, a moving body, and a pusher, installed in a tool changer, and may be restrained by a flange of the tool coupler. Thus, the tool changer and the tool coupler may be rapidly and simply coupled to each other, and the tool changer may be compact.

An inner circumference of an opening of the tool coupler and an outer circumference of a case of the tool changer may taper with a diameter decreasing downwards. Thus, a shake of the tool coupler coupled to the tool changer may be minimized, and the tool changer and the tool coupler may be firmly coupled to each other.

The plurality of case bodies may be guided by the guide groove. Thus, the plurality of case bodies may be reliably spaced apart from each other.

According to another embodiment of the present disclosure, a plurality of lockers may be rotated outwards by a motor, a driving gear, and a driven gear, installed in the tool changer, and may be restrained by the flange of the tool coupler. Thus, the tool changer and the tool coupler may be rapidly and simply coupled to each other, and the tool changer may be compact.

A diameter of the driven gear may be greater than a diameter of the driving gear. Thus, rotation torque of the driven gear and a locker coupled thereto may be increased.

An outer edge of a wing may contact the inner circumference of the opening. Thus, due to frictional force between the wing and the inner circumference of the opening, a shake of the tool coupler coupled to the tool changer may be minimized, and the tool changer and the tool coupler may be firmly coupled to each other.

A distance between a rotation axis of the driving gear and a rotation axis of the driven gear may be equal to or greater than ⅓ of a radius of the opening of the tool coupler and may be equal to or less than ⅔ of the radius of the opening of the tool coupler. Thus, the wing may sufficiently strongly press the inner circumference of the opening and may be reliably restrained by the flange.

An evasion groove for preventing interference with other lockers may be formed on the wing of the locker. Thus, the tool changer may be more compact.

In addition, an outer edge of the wing may have a curvature corresponding to the inner circumference of the opening. Thus, a contact area between the wing and the inner circumference of the opening may be increased.

While this disclosure has been particularly shown and described with reference to exemplary embodiments thereof, it will be understood by those skilled in the art that various changes in form and details may be made therein without departing from the spirit and scope of the disclosure as defined by the appended claims.

Accordingly, the exemplary embodiments should be considered in descriptive sense only and not for purposes of limitation.

The scope of the disclosure is defined not by the detailed description of the disclosure but by the appended claims, and all differences within the scope will be construed as being included in the present disclosure.

What is claimed is:

1. A tool changer provided on a manipulator of a robot, the tool changer comprising:
    a case including a plurality of case bodies;
    a fixed body disposed in the case;
    a shaft disposed in the case and extending in an axial direction of the case;
    a motor configured to rotate the shaft;
    a moving body configured to move along the shaft based on rotation of the shaft;
    a plurality of pushers connected to the fixed body via a first link, connected to the moving body via a second link, each pusher configured to press one of case bodies in an outer radial direction when the moving body moves towards the fixed body; and
    a plurality of elastic members configured to pull the plurality of case bodies in an inner radial direction.

2. The tool changer of claim 1, further comprising a connecting body coupled to the manipulator and protruding in the axial direction of the case,
    wherein a guide groove configured to guide the case body is formed on the connecting body.

3. The tool changer 2, wherein a motor accommodating portion configured to accommodate the motor is formed on the connecting body.

4. A tool changer provided on a manipulator of a robot, the tool changer comprising:
    a case including a plurality of case bodies;
    a fixed body disposed in the case;
    a shaft disposed in the case and extending in an axial direction of the case;
    a motor configured to rotate the shaft;
    a moving body configured to move along the shaft based on rotation of the shaft; and
    a plurality of pushers connected to the fixed body via a first link, connected to the moving body via a second link, and each pusher configured to press one of the case bodies in an outer radial direction when the moving body moves towards the fixed body,
    wherein an exterior of the case has a diameter that decreases downwards.

5. A tool change system comprising:
    a tool coupler coupled to a tool; and
    a tool changer included in a manipulator of a robot and selectively coupled to the tool coupler,
    wherein the tool coupler includes:
        an opening having the tool changer inserted thereinto; and
        a flange protruding inwards from the opening and configured to restrain the tool changer, and
    wherein the tool changer includes:
        a case including a plurality of case bodies;
        a fixed body disposed in the case;
        a shaft disposed in the case and extending in an axial direction of the case;
        a motor configured to rotate the shaft;
        a moving body configured to move along the shaft based on rotation of the shaft; and
        a plurality of pushers connected to the fixed body via a first link, connected to the moving body via a second link, and each pusher configured to press one of the case bodies in an outer radial direction to make the one of the case bodies be restrained by the flange.

6. The tool change system of claim 5, wherein an inner circumference of the opening and an outer circumference of the case each have a diameter that decreases downwards.

7. The tool change system of claim 5, wherein the tool changer further includes a plurality of elastic members configured to pull the plurality of case bodies inwards.

8. The tool change system of claim 5, wherein the tool changer further includes a connecting body coupled to the manipulator and protruding in a radial direction of the case; and
    wherein the connecting body is positioned inside the flange when the case is accommodated in the opening.

* * * * *